Sept. 21, 1965  E. L. McDONALD  3,207,088
INTEGRATED CANDY MAKING MACHINE
Filed June 30, 1961  14 Sheets-Sheet 1

ELWOOD L. MC DONALD
INVENTOR.

BY *clarence M. Tuck*

ATTORNEY

Sept. 21, 1965  E. L. McDONALD  3,207,088
INTEGRATED CANDY MAKING MACHINE
Filed June 30, 1961  14 Sheets-Sheet 2
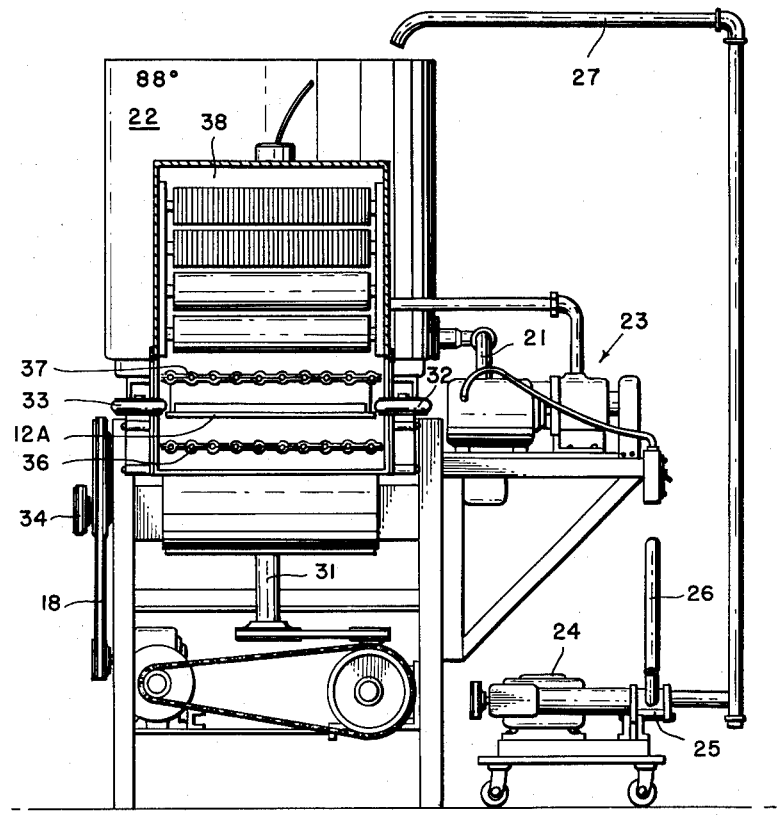
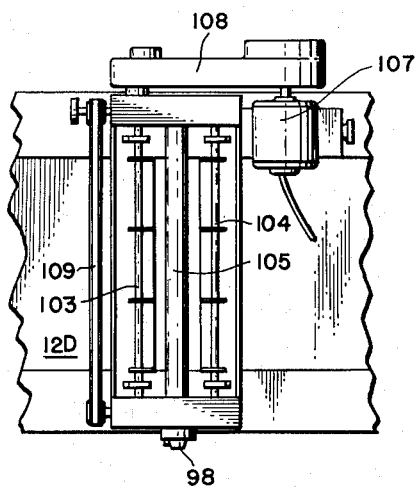
ELWOOD L. MC DONALD
INVENTOR.
BY
*clarence M. Tuck*
ATTORNEY Sept. 21, 1965 E. L. McDONALD 3,207,088
INTEGRATED CANDY MAKING MACHINE
Filed June 30, 1961 14 Sheets-Sheet 3
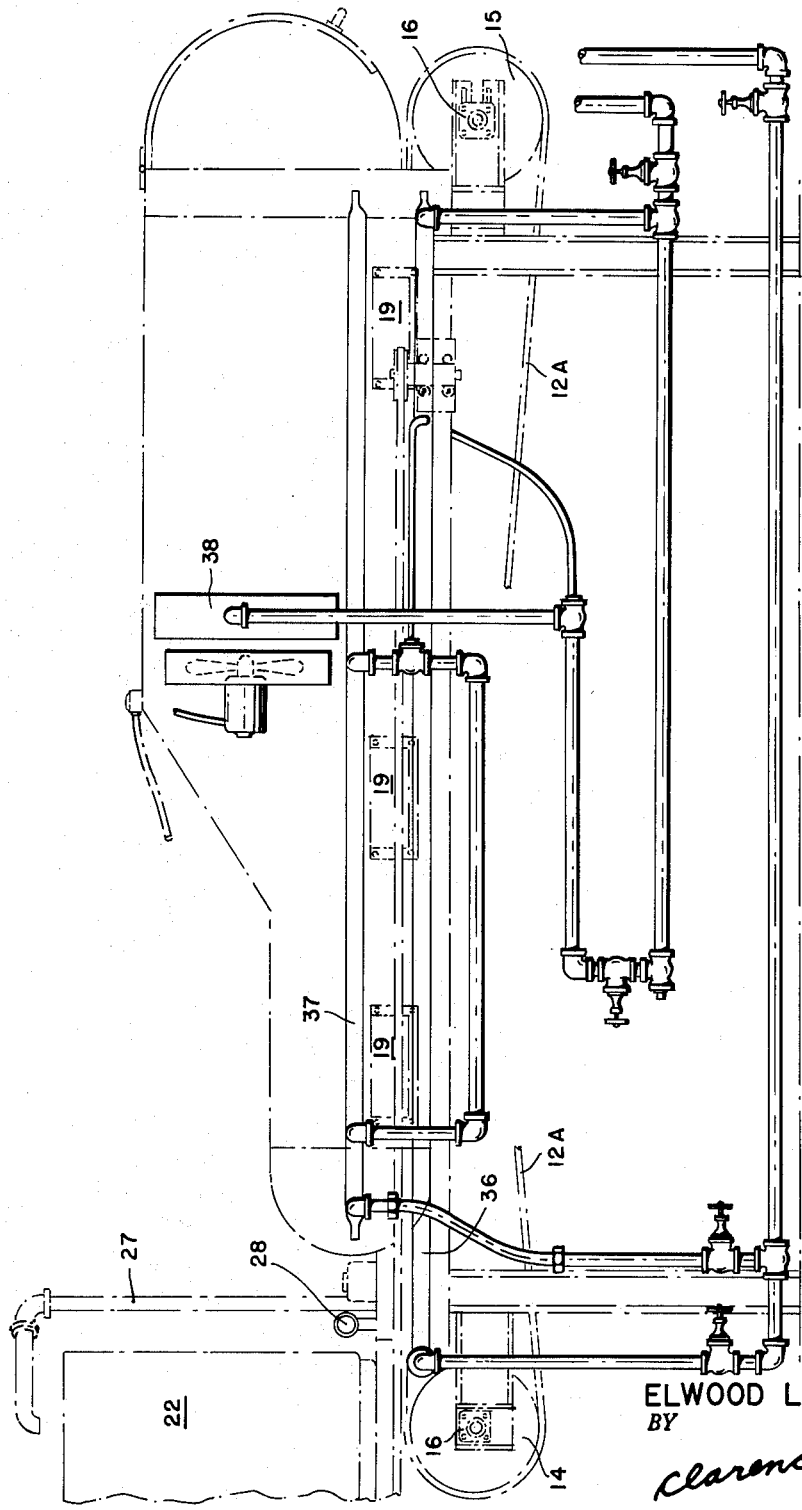
FIG—3
INVENTOR.
ELWOOD L. MC DONALD
BY
Clarence M. Tuck
ATTORNEY Sept. 21, 1965  E. L. McDONALD  3,207,088
INTEGRATED CANDY MAKING MACHINE
Filed June 30, 1961  14 Sheets-Sheet 4
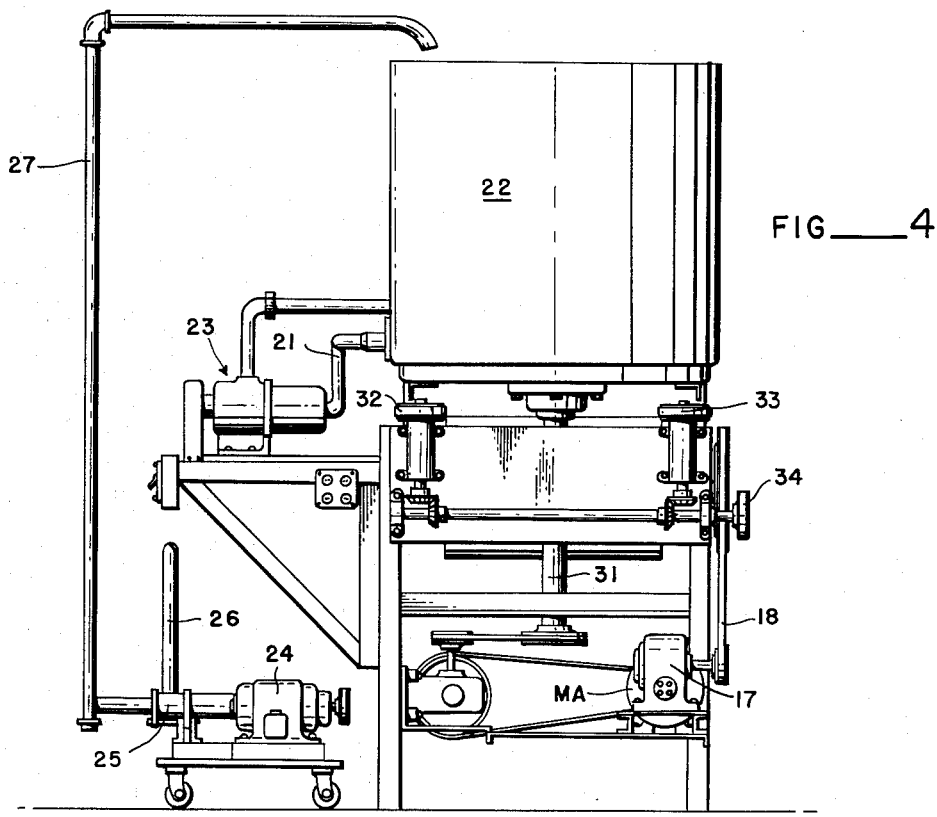
FIG__4
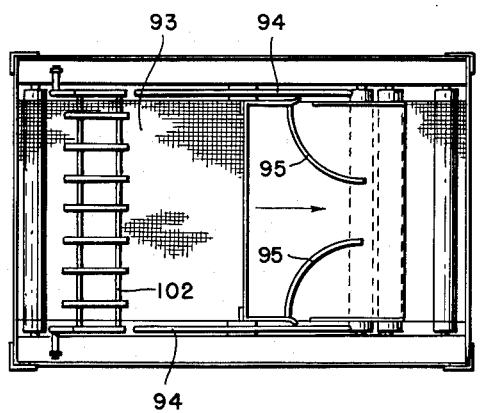
FIG__9
ELWOOD L. MC DONALD
INVENTOR.
BY *Clarence M. Tuck*
ATTORNEY Sept. 21, 1965    E. L. McDONALD    3,207,088
INTEGRATED CANDY MAKING MACHINE
Filed June 30, 1961    14 Sheets-Sheet 5
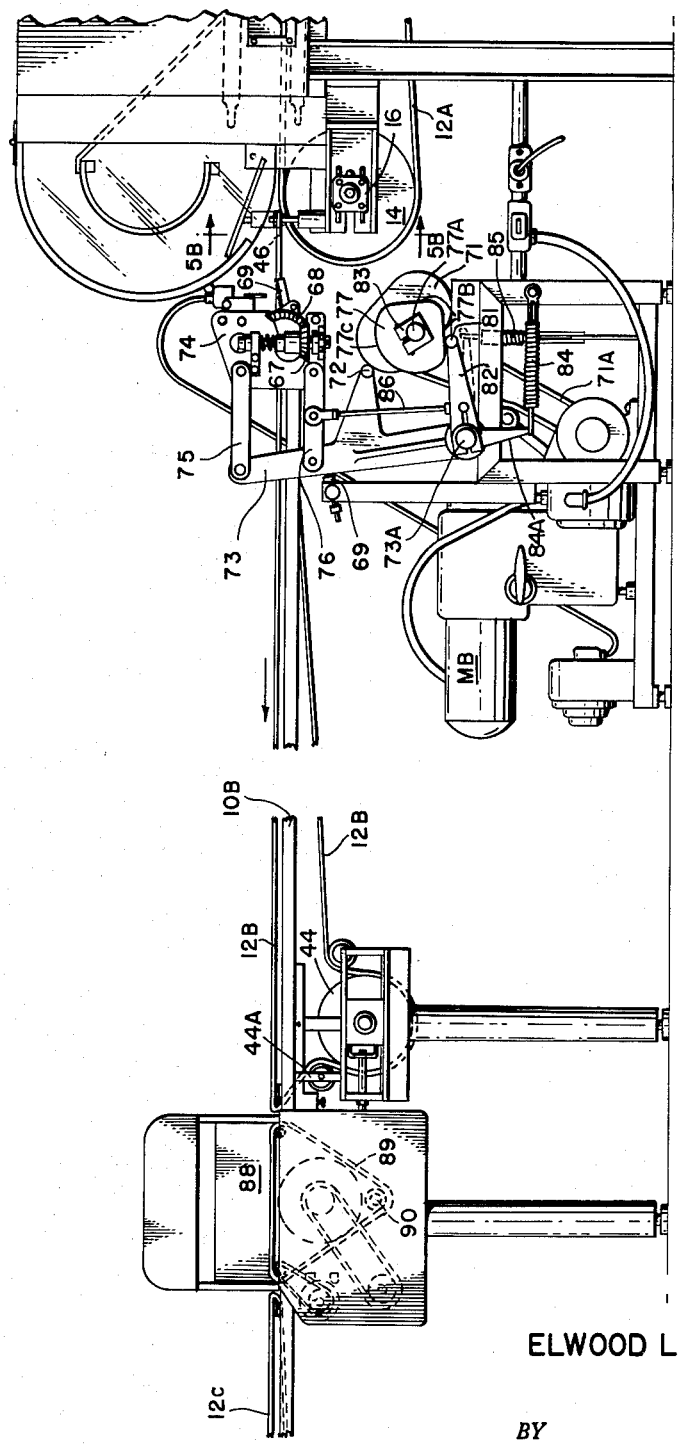
FIG—5
ELWOOD L. MC DONALD
*INVENTOR.*
BY *Clarence M. Tuck*
*ATTORNEY*

Sept. 21, 1965 E. L. McDONALD 3,207,088
INTEGRATED CANDY MAKING MACHINE
Filed June 30, 1961 14 Sheets-Sheet 6

ELWOOD L. MC DONALD
INVENTOR.

BY Clarence M. Tuck

ATTORNEY

Sept. 21, 1965 E. L. McDONALD 3,207,088
INTEGRATED CANDY MAKING MACHINE
Filed June 30, 1961 14 Sheets-Sheet 7
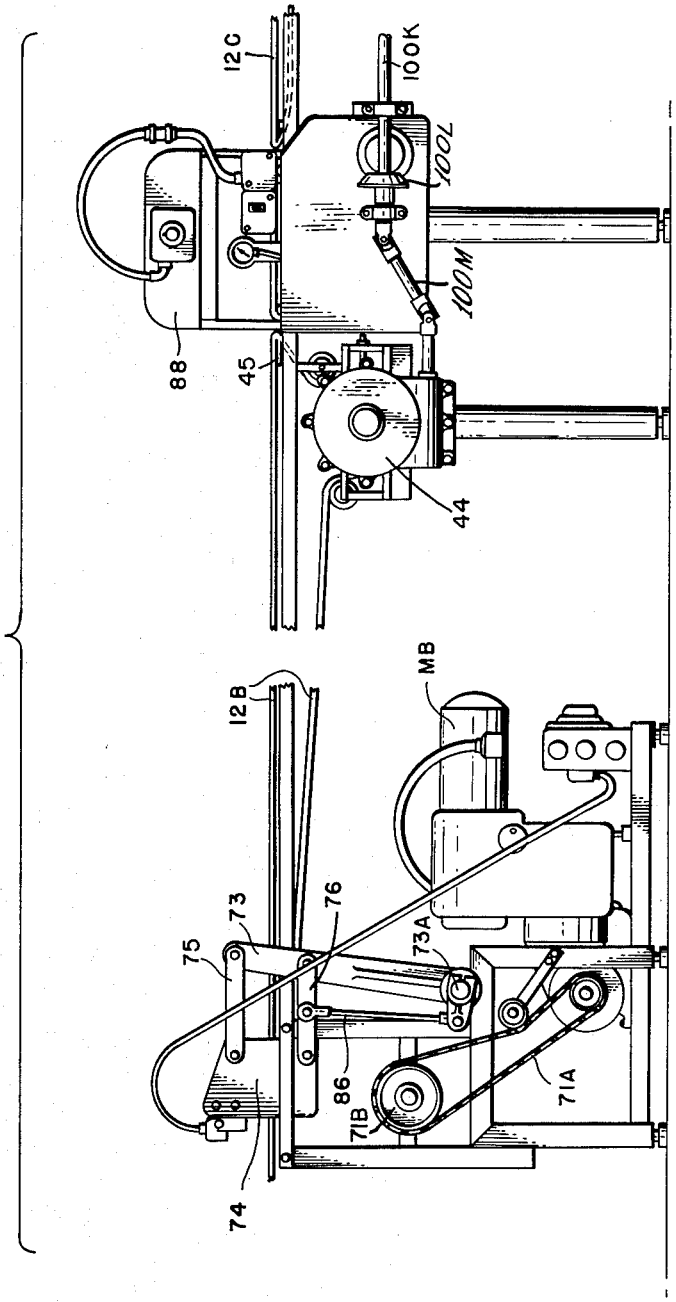
FIG — 6
ELWOOD L. MC DONALD
INVENTOR.
BY
Clarence M. Tuck
ATTORNEY Sept. 21, 1965  E. L. McDONALD  3,207,088
INTEGRATED CANDY MAKING MACHINE
Filed June 30, 1961  14 Sheets-Sheet 8
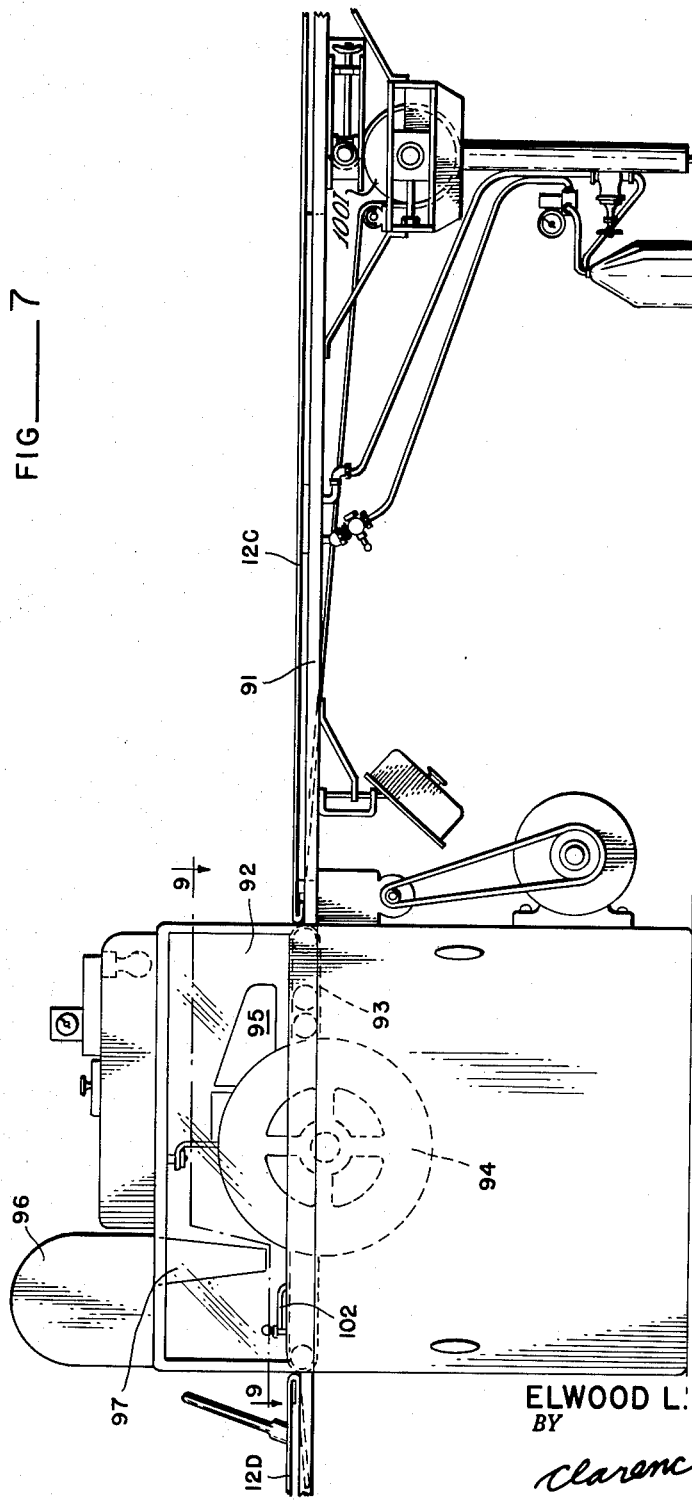
FIG—7
INVENTOR.
ELWOOD L. MC DONALD
BY
Clarence M. Tuck
ATTORNEY Sept. 21, 1965 E. L. McDONALD 3,207,088
INTEGRATED CANDY MAKING MACHINE
Filed June 30, 1961 14 Sheets-Sheet 9
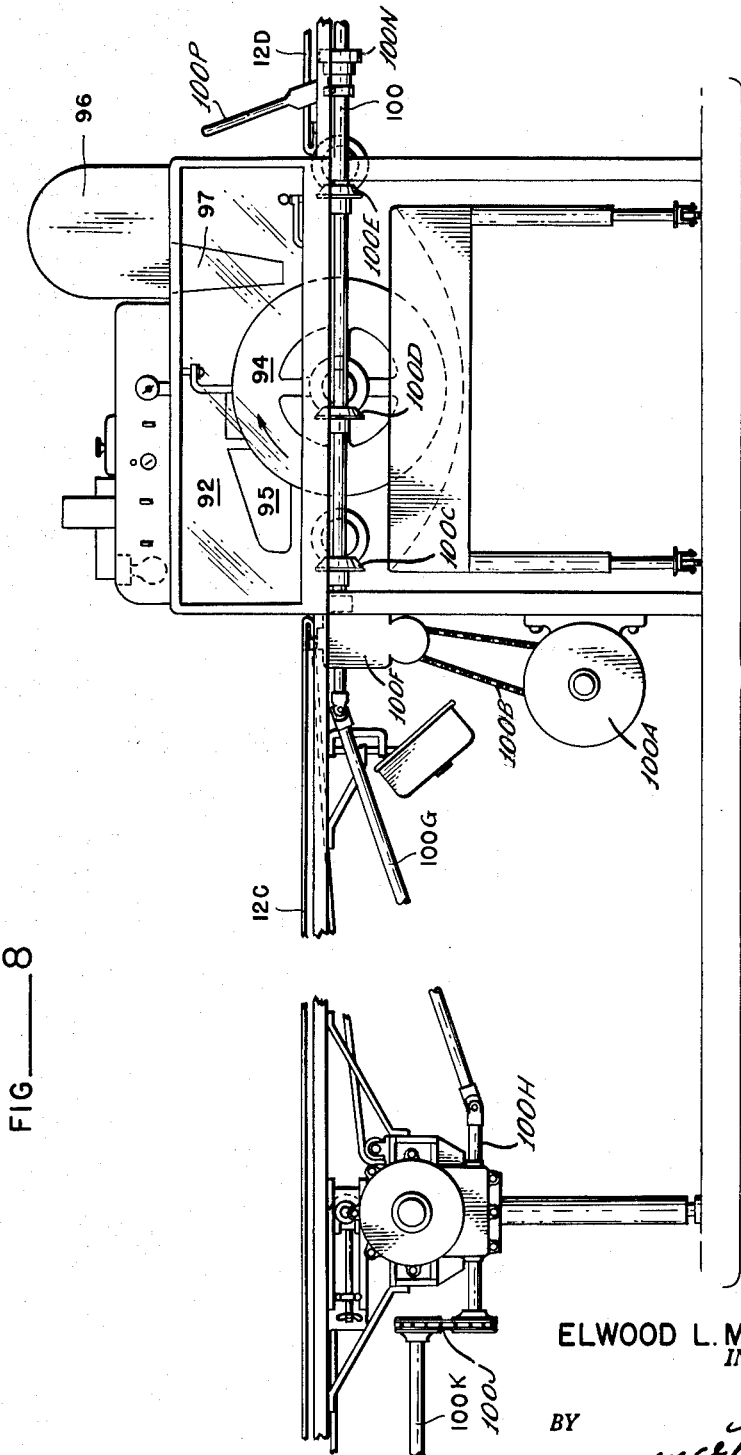
FIG—8
ELWOOD L. MC DONALD
INVENTOR.
BY *Clarence M. Tuck*
ATTORNEY

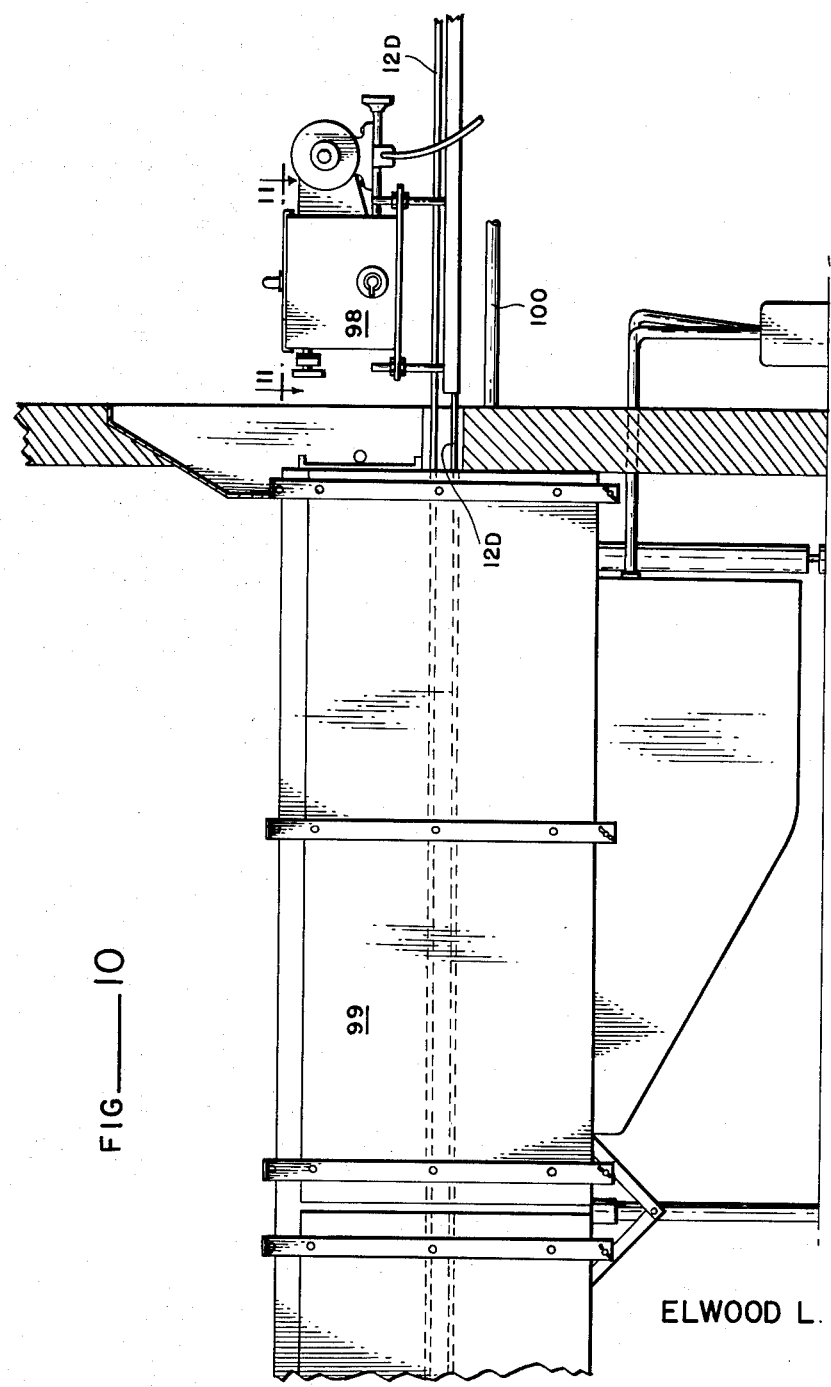

Sept. 21, 1965  E. L. McDONALD  3,207,088
INTEGRATED CANDY MAKING MACHINE
Filed June 30, 1961  14 Sheets-Sheet 11
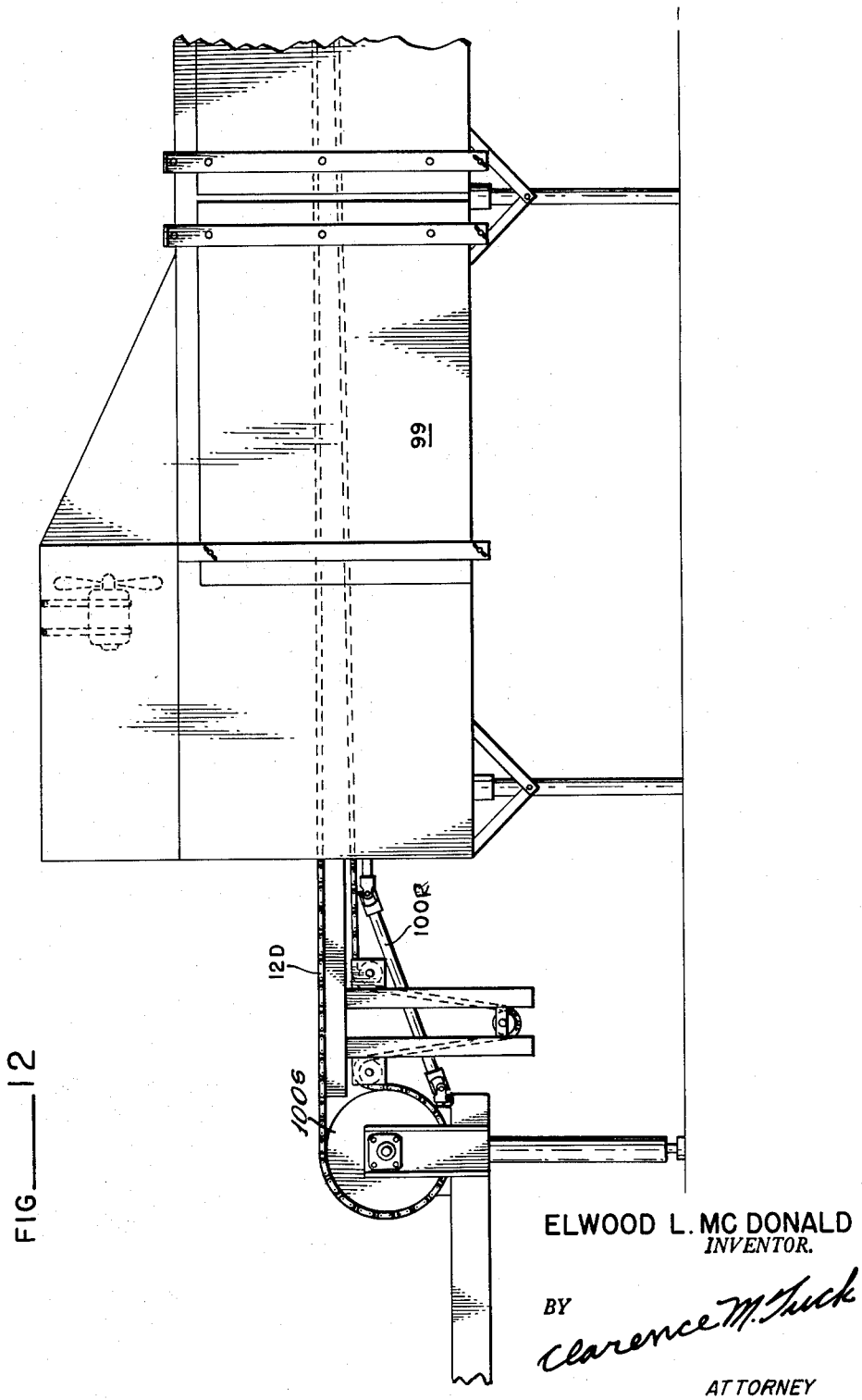
ELWOOD L. MC DONALD
INVENTOR.
BY Clarence M. Tuck
ATTORNEY Sept. 21, 1965 E. L. McDONALD 3,207,088
INTEGRATED CANDY MAKING MACHINE
Filed June 30, 1961 14 Sheets-Sheet 12

ELWOOD L. MC DONALD
INVENTOR.

BY Clarence M. Tuck

ATTORNEY

Sept. 21, 1965  E. L. McDONALD  3,207,088
INTEGRATED CANDY MAKING MACHINE
Filed June 30, 1961  14 Sheets-Sheet 13

ELWOOD L. MC DONALD
*INVENTOR.*

BY
*Clarence M. Tuck*

ATTORNEY

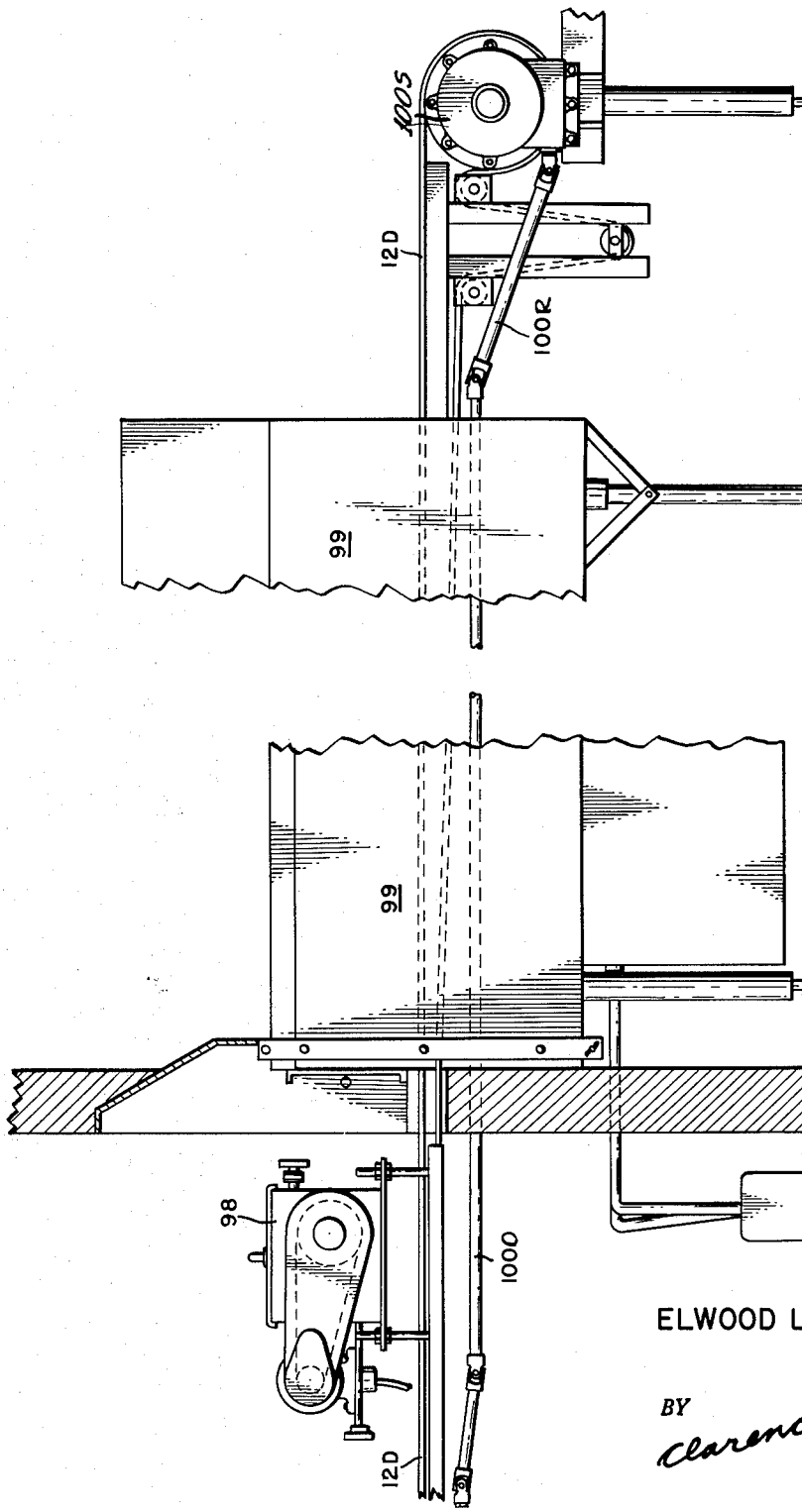

United States Patent Office 3,207,088
Patented Sept. 21, 1965

3,207,088
INTEGRATED CANDY MAKING MACHINE
Elwood L. McDonald, Seattle, Wash., assignor to Frederick & Nelson, a division of Marshall Field & Company, Chicago, Ill., a corporation of Illinois
Filed June 30, 1961, Ser. No. 120,984
11 Claims. (Cl. 107—4)

This present machine relates to that general class of candy making machines designed to handle fondant type candy bases. More particularly, this invention relates to an integrated machine which accepts the candy mix in liquid form and effects the various temperature changes required to reduce the liquid mix to a flat ribbon which can be built up and firmed to the required depth of the finished candy core on a longitudinally moving belt ready for the successive steps in the finishing of the candies. The average depth is usually approximately one-half inch.

In a typical machine the built-up ribbon of candy base may be 24 inches in width and this ribbon is passed through sequential operations, all of which are temperature controlled, so that the core emerges from the first stage as a rectangular solid. This core is then cut and by the cutting and parting means employed, results in separate candy pieces that are spaced apart on the belt so that in succeeding operations coatings can be given them and finally any decorative outside finish can be applied. The various operations employed require different temperatures and different periods of exposure to ambient air temperatures. This makes it desirable to have the candies move at varying speed through housed-in sections of the belts where the optimum temperatures are employed. The final output of the mechanized portion of this equipment passes into a relatively long, tempering tunnel, from which the candies are delivered at the proper temperature for the solidification of the various components so that they can then be readily handled in the final packing operations.

Candies of this order have long been made by laborious hand operations which required candy makers with a high degree of skill and training. The resultant cost of the product was in many cases higher than the market could readily absorb, making it necessary to omit certain steps if the candy was to be produced at price levels acceptable to the buying public. This short cut method adversely affected the uniformity and quality of the finished product. In this present machine, however, the operations required are each performed with an exactness which insures that each subsequent batch of candy will be produced under identical conditions so that the end product will unfailingly be of a uniform character. A very desirable end result is that once a customer has become acquainted with and enjoys the confection he can thereafter buy with confidence, knowing that each successive package of candy will be identical with the one originally enjoyed. This consumer reaction is generally ignored by makers of the cheaper types of candy, but where the best of ingredients are used in order to produce the very finest candy of its type, it follows that once a clientele has been built up and indoctrinated with the idea of a particular type of candy they should never be disappointed in any future purchase. It is believed that this present machine and the method employed in making certain of the fondant type candies will satisfy this demand for a uniform product.

The principal object of this invention, therefore, is to provide an integrated machine which will take a candy base in liquid form and convert it into a solidified, temperature reconciled candy.

A further object of this invention is to provide a machine which will insure a uniformity of product from day to day and will deliver, as the end product of the machine, a temperature conditioned product having the highest keeping qualities of which the candy base will admit.

A further object of this invention is to provide a machine which will solidfy a candy base on a plurality of moving belts and carry the same through a plurality of temperature controlled chambers as they are required for the proper handling of the candies when they undergo the various sequential operations necessitated in their manufacture.

A further object of this invention is to provide means for handling a relatively large amount of candy in an orderly manner and which will cut the ribbon of candy into the serving sizes desired and will then separate these individual candy pieces so that various coatings can be applied to them individually in a uniform manner.

Further objects, advantages and capabilities will be apparent from the description and disclosure in the drawings or may be comprehended or are inherent in the device.

In the drawings:

FIGURE 2 is a transverse sectional view in elevation, taken along the line 2—2 of FIGURE 1.

FIGURE 3 is a side elevation from the right hand side of the feeding end of this machine and showing in greater detail the piping arrangement not shown in FIGURE 1 because much of it would be hidden.

FIGURE 4 is an end elevation of the feeding end of this equipment.

FIGURE 5 is a side elevation taken from the left side of this machine and broken in the center so that the parts may be shown on an increased scale. This section illustrates the division of the machine which accepts the candy flow from the equipment illustrated in FIGURES 1 through 4.

FIGURE 6 is a broken fragmentary elevation view from the right side of the machine with many parts deleted to show the drive means and certain functioning parts that were obscured in FIGURE 5.

FIGURE 7 is a side elevation from the left side of the machine, illustrating the third functional division of the belt line operation.

FIGURE 8 is a view in elevation, partly broken away to better illustrate the interior structure, and illustrating a portion of FIGURE 7 from the right hand side of the machine.

FIGURE 9 is a sectional view in plan taken along the line 9—9 of FIGURE 7.

FIGURE 10 is an elevation taken from the left side of the machine and illustrating the end of the machine proper and the beginning of the tempering tunnel.

FIGURE 11 is a fragmentary top plan view of a portion of FIGURE 10 along line 11—11 with certain parts removed to show the general arrangement of a typical cholocate or coating decorator suitable for use with this equipment.

FIGURE 12 is a side elevation taken from the left side.

of the tempering tunnel and showing the final discharge of the finished tempered candies as produced by this machine.

Figure 13:
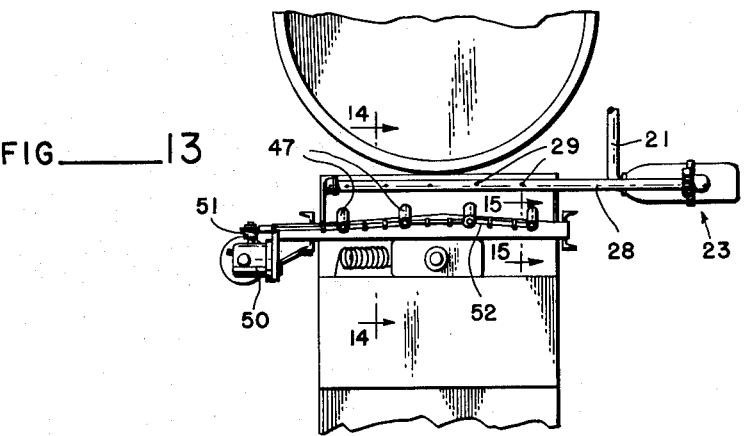

FIGURE 13 is a fragmentary top plan view of the candy mix feeding mechanism.

Figure 14:
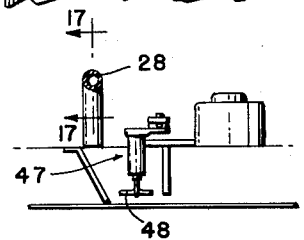

FIGURE 14 is a side elevation of a portion of FIGURE 13 along the line 14—14.

Figure 15:
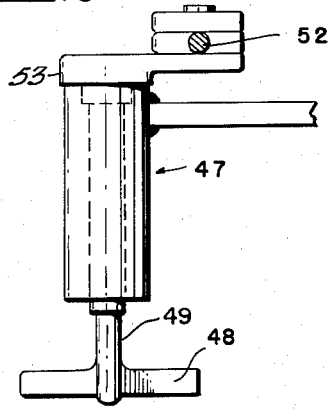

FIGURE 15 is an enlarged scale elevation of the candy base spreading means for the plurality of discharge openings, taken along the line 15—15 of FIGURE 13.

Figure 16:
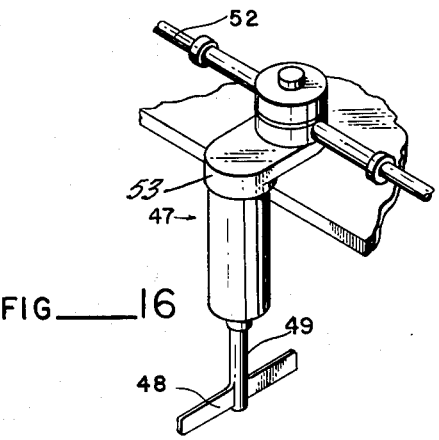

FIGURE 16 is a perspective view of the spreading means of FIGURE 15 and showing the flexible shaft drive therefor.

Figure 17:
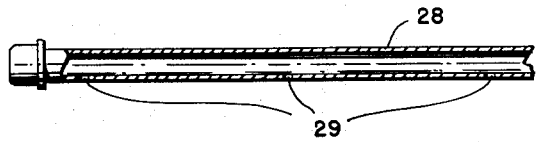

FIGURE 17 is a sectional view of the discharging tube as viewed along the line 17—17 of FIGURE 14.

Figure 18:
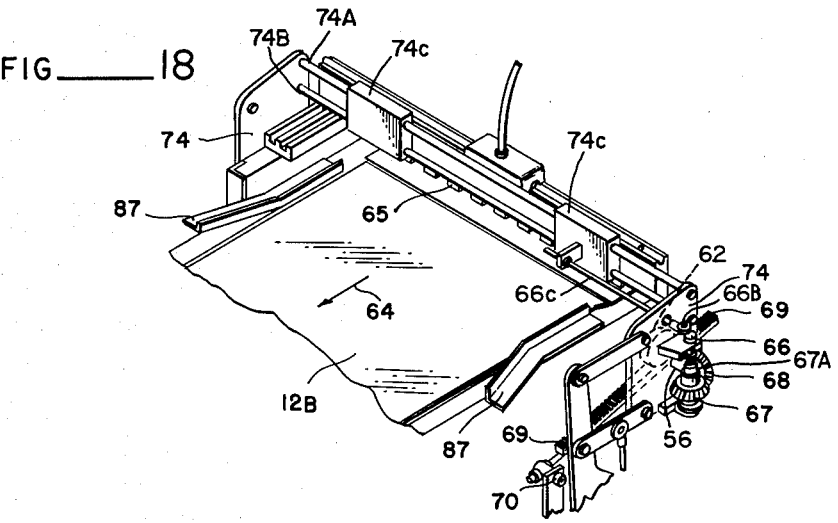

FIGURE 18 is a perspective view of the transverse candy cutting mechanism.

Figure 19:
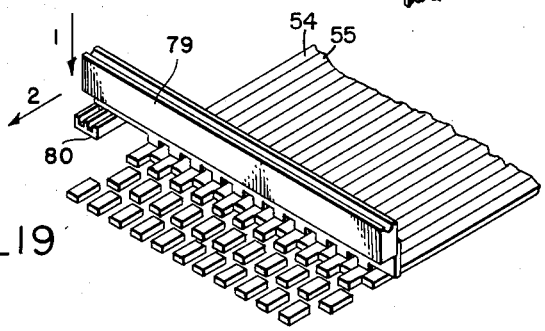

FIGURE 19 illustrates the first cutting operation.

Figure 20:
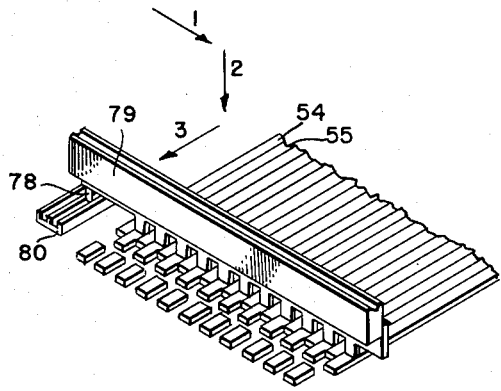

FIGURE 20 illustrates the second cutting operation after the knife has moved transversely of the belt from its position in FIGURE 19.

Figure 5A:
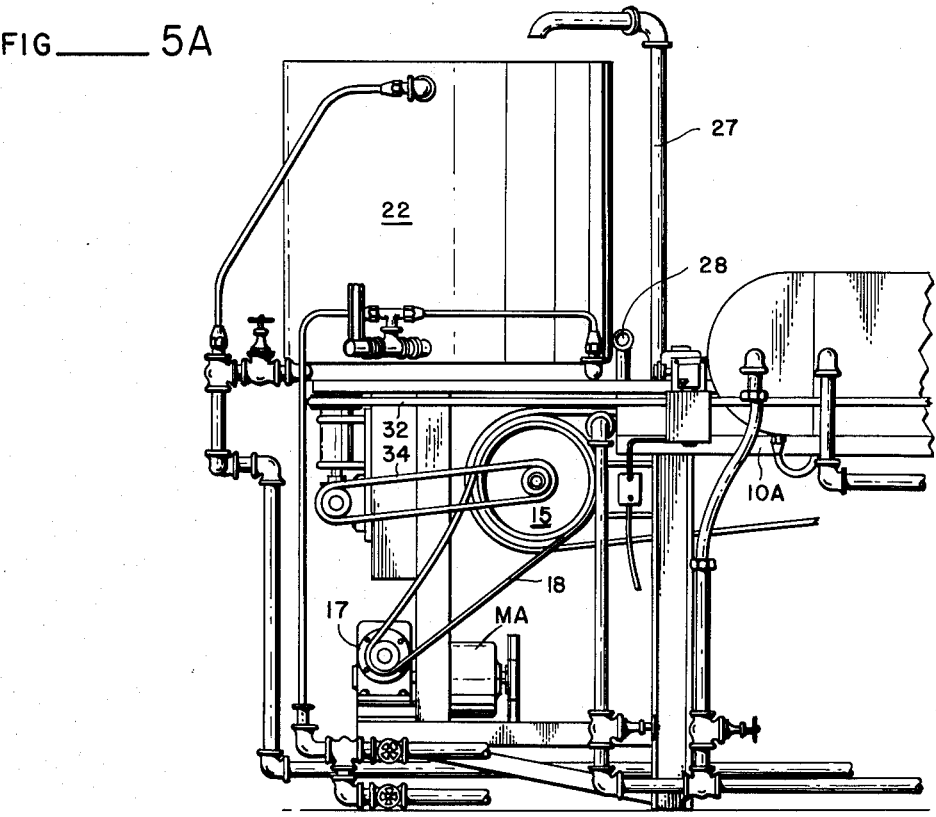
FIGURE 5A is a fragmentary view in elevation and taken from the right hand side of the feeding end of this machine, primarily to illustrate one form of drive means of the marginal belts which assist in forming the ribbon of candy base and giving it additional support as it passes through certain temperature changing zones.
Figure 5B:
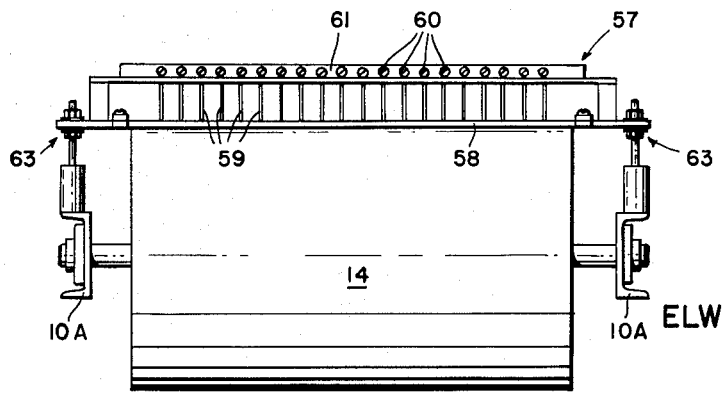
FIGURE 5B is a transverse elevation of the wire candy strip cutting means along line 5B—5B of FIGURE 5.
Figure 21:
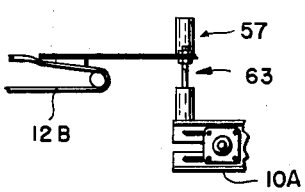

FIGURE 21 is a partial side elevational view of the cutter support structure shown in FIGURE 5B.

FIGURE 22 is an elevation from the right side of the machine and showing both ends of the tempering tunnel and the drive means for the belt serving the same.

In the drawings, throughout which like reference characters indicate like parts, the numeral 10A designates generally the frame of the first or feeding section of this integrated machine and consists of longitudinal and transverse horizontal members and other vertical members as are required to give a rigid vibrationless framework. Disposed longitudinally on framework 10A is a drive and candy conveyor belt 12A which is operatively disposed upon drums 14 and 15 which serve as return and drive pulleys respectively for this wide belt. Suitable belt tighteners are provided as at 16. Pulley 15 is driven by motor $M_A$ which drives through a reduction gear 17 and a final chain drive 18. Suitable guide means are provided for belt 12A, as guide members 19, which are desirable considering that drums 14 and 15 are cylindrical rather than coned as the usual belt pulley. This construction is advantageous in that the upper face of belt 12A is the receiver of the candy and should be preserved in a planar manner. Guides 19 are provided with transversely disposed rods and rollers 20 which support the belt at different places along its length and insure its transverse flatness.

The candy mix for the various types of fondant base candies is supplied at a temperature that will keep all the ingredients in liquid form and which will vary somewhat with the various ingredients. For an exemplary chocolate based candy this is usually approximately 88° F. The liquid candy mix is supplied to the storage tank 22. In some installations it is desired that means be provided for mixing the ingredients in tank 22, but it is more common to mix the particular batch of candy under optimum conditions in a separate container and pump it into tank 22 which has been cleaned of all former candies. One satisfactory arrangement has been found to be the provision of a portable pump unit having the electric motor 24, the pump 25, a hinged type of suction pipe 26 and a discharge pipe 27. Stirring means for the liquid candy is provided by shaft 31, having suitable paddles secured into its upper end. These paddles are not illustrated in the drawings.

The candy is pumped from tank 22 through the tank discharge pipe 21 by means of the motorized pump 23. This means is provided to insure a uniform flow to the header 28 and the liquid then flows out through a plurality of nozzles 29 onto the upper surface of belt 12A.

It is desirable that the temperature of the candy be accurately controlled and to this end means for maintaining a desired temperature of the fluent candy base comprising a plurality of heat lamps is provided at 30, which may be thermostatically controlled to insure exact temperature in the header 28 to give a resultant temperature in the candy as desired.

As the candy is flowed onto belt 12A in liquid form, means are provided for containing the same and keeping it from overflowing the edges of the belt. One satisfactory arrangement, shown in FIGURE 4 and in FIGURE 5A provides marginal belts, one on each side of belt 12A, which are indicated at 32 and 33. These belts are driven through suitable gearing by the chain drive 34 which is connected to the shaft of drum 15. Consequently, the speed of the two marginal belts and the main belt 12A can be accurately synchronized.

Figure 1:
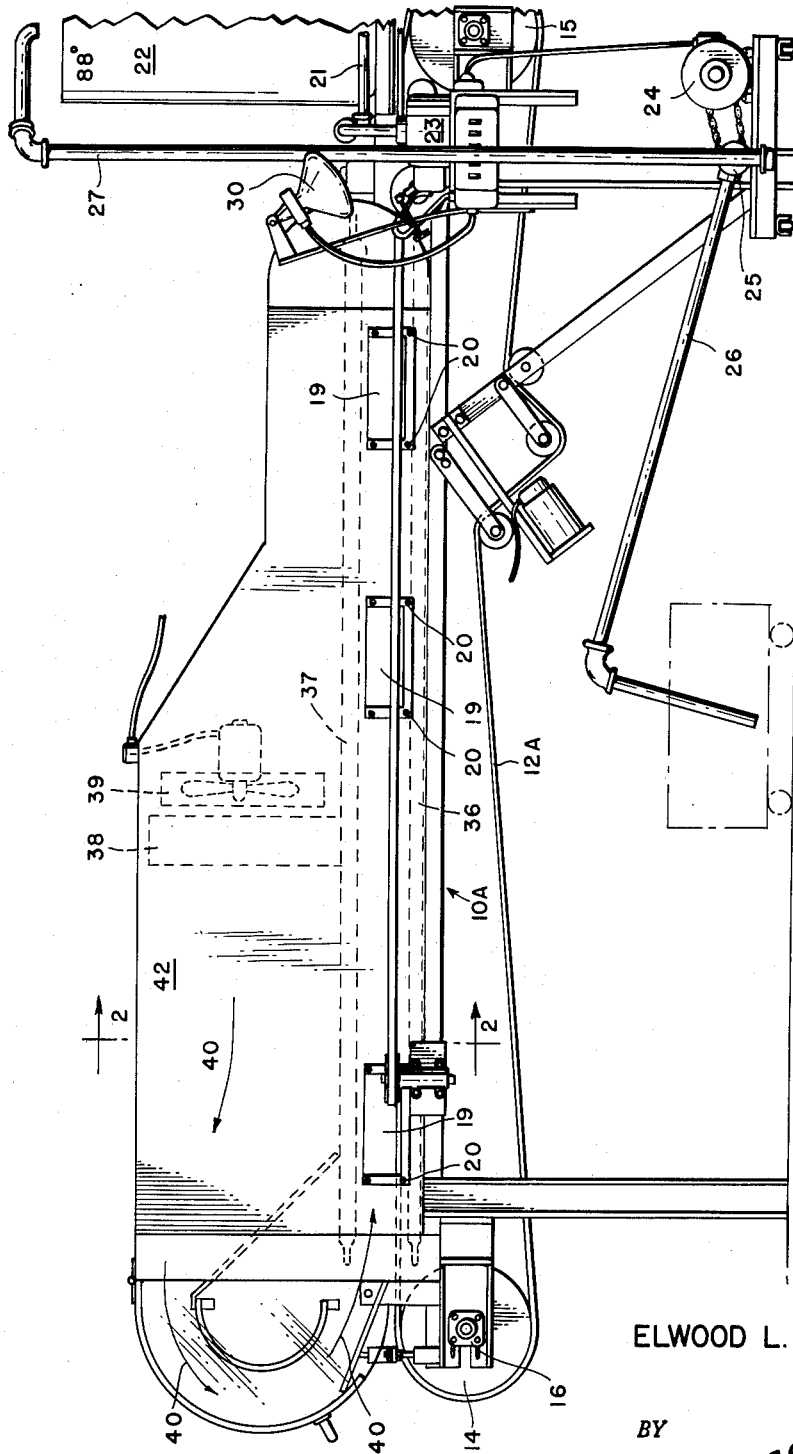
FIGURE 1 is an elevation of the feeding end of this present machine taken from the left side when looking down the line of travel of the candy products as they pass through the machine.

It is desirable to keep the candy ingredients in suspension in liquid form so as to insure a homogeneous mixture. However, when this mixture is flowed onto the upper surface of belt 12A it is essential that refrigerating means be provided for quickly solidifying the liquid candy and this means is variously provided. One plate cooler 36 is disposed below the upper run of belt 12A and a second plate cooler 37 is disposed above the belt and in reasonably close proximity to the candy. There is still however a problem of dissipating the heat from the candy, and this is best accomplished by providing a source of refrigerated air through the cooling cell or heat exchanger 38 and blowing this air by means of the motorized fan 39 around the baffling means illustrated in FIGURE 1 so that the air will flow generally in the direction of arrows 40 and will finally be directed on top of the belt carrying the candy and below the upper plate cooler 37. A common temperature for the ambient air inside of housing 42 and the candy base is approximately 41° F. In order to indicate the general range of temperatures that may be required, the various parts of the machine through which the candy passes have the temperature used applied to the drawings. The values given apply to a chocolate fondant candy base and were determined by trial as should the temperatures and travel times for other mixes.

Referring to FIGURE 5 and to the right hand side of the same as viewed, there is a showing of the discharge of the candy from belt 12A to a second belt 12B. This belt is driven through appropriate reduction and variable speed gearing driven from shaft section 100K through section 100M and in turn driving roller type pulley 44 shown in FIGURE 6. Pulley 44 drives the second candy conveyor belt 12B through suitable belt tightening means 44A as illustrated in FIGURE 5. At each end the upper surface of belt 12B passes around a relatively small diameter plate return 45 and 46. This construction makes it possible to obtain close contact between the succession of belts so that the candy ribbon can be transferred from one belt to the other by the friction of the main body of the candy on the belt. At this stage the candy is cold enough to have considerable body and will not therefore be distorted by this short gap transfer means.

The candy is flowed onto belt 12A by a plurality of discharge orifices or nozzles 29. However, to insure a uniform and standard thickness, means for distributing the candy base across said belt 12A as a candy ribbon comprising a plurality of spreading heads 47 are employed. These heads have foot portions 48 which substantially engage belt 12A and are caused to swing through an arc about spreader shafts 49 to spread the candy mix before it can solidify. A power operated gear box 50 has an oscillating crank 51 shown in FIGURE 13 and connected to the flexible shaft member 52 operatively connected to cranks 53 secured to the top of shafts 49 to give the same degree of oscillation to each of the feet or paddles 48.

Referring to FIGURE 5B, wherein the longitudinal candy cutter is illustrated, a framework 57 is provided which has at its bottom a wire anchor bar 58. To this bar are anchored suitable wires 59. These are tightened by the screws 60 in the upper wire bar 61. The candy cutting wires are spaced apart an amount corresponding to the widths of the strips into which the ribbon of candy is to be cut. It is to be noted that framework 57 is so disposed that the wires engage the ribbon of candy to be cut in the space between belts 12A and 12B. The lower bar 58 is secured to frame 10A by means 63 permitting its vertical adjustment. The vertical adjusting means 63 as seen in FIGURES 5, 5B, and 21 may be made of a conventional threaded rod with nuts thereon to hold bar 58.

After the candy ribbon has been cut in two series of alternately disposed longitudinal strips 54 and 55 by the cutting wires 59 it is then engaged by the transverse cutting means which is associated with a further means for longitudinally spacing the candy pieces, which, when the transverse cuts are made, normally have a rectangular form. This involved operation is effected by the means probably best shown in FIGURES 18 through 21 inclusive and the cam actuating means for providing the different motions required, which is shown in FIGURE 5. Referring to FIGURE 18, the candy which is flowing in the direction of arrow 64 is engaged by the toothed cutting knife 65. The toothed arrangement provides teeth of rectangular form which are the width of the strips into which the ribbon of candy has been previously cut by wires 59 and the spaces between the teeth are equal to the width of the teeth so that only alternate strips of candy are cut by one depression of knife 65. These slitting and cutting operations are best performed at an ambient air temperature of 68° F.

The knife assembly is moved transversely by a crank arrangement illustrated at 66. The crank is in effect a vertical shaft means 67A extending upwardly from bevel gear 67. At the upper end of said shaft 67A pivotal off-center or eccentric connection 66B is made with a rod 66C which in turn is attached as desired to the knife assembly. The crank is driven by the bevel gear 67 and a segmental gear 68 having teeth adapted to coact with the teeth of gear 67. Segmental gear 68 is disposed for partial rotation about its axis of rotation on short shaft 56 and is driven by a small spur gear 62 at the inside end of short shaft 56 indicated in FIGURE 18. The spur gear 62 meshes with rack gear 69 which is pivoted on a fixed pivot at 70. Referring to FIGURE 5, the actuating means is provided with means for moving the entire candy cutting knife assembly longitudinally of the belt 12B, to provide longitudinal spacing of the candy pieces, and this in turn is effected by longitudinal movement cam 71 which, through the cam follower 72, moves the pivoted lever 73 in a plane parallel to the movement of belt 12B. In order to effect the movement of the knife assembly two levers 73 are used and are connected by shaft 73A which forms their pivots so that only one cam 71 is required. Levers 73 are connected to the end plates 74 of the knife assembly by means of the parallel links 75 and 76. Knife 65 is secured to knife frame member 79 which in turn is secured at its ends to the plates 74. Plates 74 are connected by suitable positioning and track means comprising bars 74A and 74B whereon blocks 74C secured to knife frame 79 are slidably mounted for reciprocation of the knife assembly by the rod 66C. As the connecting shaft 56 between the segmental gear 68 and its driving pinion 62, meshing with rack 69, is mounted for partial revolution within the end plate 74, the partial revolution of crank 66 is made during each cycle of operation. It is also necessary to lift the knife assembly in order that it may pass over the uncut candy strips sufficiently so that the teeth of knife 65 will be positioned immediately over the second series of candy strips 55 to be cut. This is effected by a second or lift cam 77 which, together with cam 71, is mounted on shaft 77A which is operatively driven by the reduction gear and variable speed drive motor unit $M_B$ driving chain 71A. Chain 71A drives shaft 77A through a pulley or sprocket 71B as shown in FIG. 6.

During the cutting operation it is necessary that the cutting teeth of knife 65 engage only the series of candy strips that it is timely to cut and to insure this a stud 78 is secured in the dual purpose knife frame and heater member 79 and in turn this stud engages one of the two grooves formed in the guide groove bar 80. The stud is raised out of engagement with the groove in bar 80 at the same time the cutting knife 65 is raised above the top level of the candy and this is effected by the cam follower 81 and the duplicate lift levers 82 mounted on shaft 73A, one on each side of the machine. Levers 82 are connected to one of the parallel links, as 76, disposed on each side of the machine and thus in proper sequence the lifting operation is effected by cam 77 and spring 84. It will be noted that cam 77 has two essentially flat side portions 77B which are closer to the axis of rotation of said cam 77 than the remainder of its configuration. Follower 81 is permitted to move up twice during a rotation of cam 77 to in turn raise lift rods 86 through levers 82 thus lifting the frame 79 and knife 65. At the same time, crank 66 shifts frame 79 and knife 65 to engage alternate candy strips 54 and 55. Each time that the knife is raised and shifted, stud 78 will align with and engage a different groove of guide bar 80. A claim means 83 which is detachable and connected to cam 77 is provided to secure cam 77 to shaft 77A bearing cam 71 so that the sequential operation can be accurately adjusted. The teeth of knife 65 are sharpened, of course, to sever the candy strips 54, 55 with a clean incising action.

A further function is moving the cutting knife 65 in the direction of movement of the belt in order to move each of the alternate pieces of candy forward so that the two rows of cut candy pieces will appear in staggered relationship as is indicated particularly in FIGURE 20. This is to facilitate the coating of the candy pieces, and in order to achieve this on all sides it is necessary that the candy pieces be spread apart a sufficient distance both transversely and longitudinally so as to adequately uncover both the sides and the ends of the candy. Cam lever return spring 85 is provided for cam 71 as illustrated in FIG. 5. Said spring 84 maintains cam follower 81 in engagement with cam 77 by being tensioned to arm 84A which in turn is rigidly connected to said lift lever 82. Lift levers 82 are operatively connected to lower link 76 on each side of the machine by push or lift rods 86. As each alternate strip of candy is cut transversely by knife 65 it is necessary that belt 12B and all following belts move faster than belt 12A so that the longitudinal spacing of the candy pieces will find sufficient belt length to permit spreading the candies longitudinally of belt 12B by longitudinal movement cam 71.

As the individual pieces of candy are carried down the belt any partial pieces on the outside of the belt resulting from insufficiently wide strips are directed off by the trimming means 87 so that all that passes beyond this point are perfectly formed pieces of candy. The temperature of the candy as it leaves the trimming means is substantially the temperature of the ambient air, preferably about 68° F.

If it is desirable to chocolate coat the bottom of the candy pieces, the candy is refrigerated so that the bottom temperature is 41° F. and passed from belt 12B on to bottom coating means comprising a metal open link belt within the housing 88 illustrated in FIGURES 5 and 11 and this belt is indicated at 89. Belt 89 is formed of a plurality of links of limited extent in the horizontal plane so that as the belt goes down under the lowermost sheave 90 it picks up the coating material from the bottom compartment and then as it comes up into the horizontal position the coating is transferred to the candies being carried on the horizontal part of belt 89.

Leaving belt 89, the candies then are deposited upon a third candy conveyor belt 12C. Belt 12C is positioned upon a refrigerated plate 91 so that the temperature of the candy is dropped very appreciably before it enters the coating means or machine 92, illustrated in FIGURES 7 and 9, where the body of the candy, exclusive of the bottom, is coated. Here again the candies are refrigerated to substantially 41° F. and then passed from belt 12C to a short length of screen belting 93 on which they are carried through machine 92 and then deposited on belt 12D, the greater part of which is housed within tunnel 99. On each side of the machine are power driven wheels 94 having screen peripheries and metal side plates. These wheels extend down into a fluent coating material and act as elevators for the same. The coating material is scraped off the wheel by inner ends of vanes 95 and then directed, by distributing vanes 95, over the candies in an excess amount. The excess coating is removed by vibration means shown at 102 underlying belt 93 (FIGS. 7 and 9), and by an air blast directed down upon the candy. Vibration of vibrator 102 is accomplished by an eccentric or other common means. A power driven fan 96 provides the air which is properly directed by the air nozzle 97.

In the making of quality candy it is always desirable to have a definite and recognizable configuration applied to or in the final coating of the candy. Such a unit is shown at 98 in FIGURE 10 and in top plan view with the cover removed in FIGURE 11. Before entering into the configuration device the temperature of the candy is dropped by means of the refrigeration member 91 which is preferably of the so-called refrigeration plate type, a commercial product. In this showing the configuration elements are shown at 103 and 104 and these consist of various types of means for melting the surface of the chocolate coating or to apply additional coating thereto in some configuration. The final details of this configuration are a matter of the choice of the individual manufacturer and are not shown in detail as no claim, except as part of the general combination, is made for this equipment as it may be purchased commerically. In order to bring the top surface of the candy up to the stage where it can be easily worked, a heating bar 105 is provided. The configurating elements 103 and 104 are rotatably driven through suitable reduction means 108 by the electric motor 107. An auxiliary drive is provided by belt 109 and the associated members 103 and 104 may be driven from each end. Heat is radiated by bar 105 to elements 103 and 104 and to the candy itself. Elements 103 and 104 are elongated shafts supporting and surrounded with elongated configurating attachments which, of those skilled in the art are aware, contact the top of the candy to impress a desired design or pattern thereon.

Shaft 100, shown in FIGS. 8, 12, and 22, is a multiple sectioned drive train actuating numerous parts and elements. A drive motor 100A (FIGURE 8) through chain or belt 100B powers reduction gear box 100F. Gear box 100F has a shaft section to which are attached bevel gears 100C, 100D, and 100E for driving belt 93, elevator wheels 94, and vibrator 102. A clutch mechanism 100N, operated by handle 100P, enables selective driving of shaft portion 100O. Shaft portion 100O leads to drive drum 100S, through shaft section 100R universally connected to the drive gearing of drum 100S and shaft section 100Q. Drum 100S drives belt 12D. The reduction gear box 100F also drives universal shaft section 100G and shaft section 100H which in turn powers drum 100I. Drum 100I drives belt 12C. Shaft section 100H is connected as by chain 100J to shaft section 100K. Shaft section 100K carries bevel gear 100L for actuating the parts in bottom coating housing 88. Finally shaft section 100K is connected universally by shaft section 100M to the gearing of drum 44 which drives belt 12B.

Throughout the present specification the temperatures given are for one type of mix and it may be necessary to vary this initial temperature of 88° F. and in so doing the intermediate temperatures will possibly be subject to modification which can best be determined by trial. However, once a determination has been made for a given mix it should then be carefully followed; otherwise part of the value of the machine will be lost in that the product will not be uniform in its appearance, taste and keeping qualities as made from day to day. Attention is further directed to the relatively great length of the tempering tunnel 99. It has been found that a length of 50 to 60 feet is usually desirable, but this again will vary somewhat with the mix used and it is for this reason that the tempering tunnel is best made in sections so that they may be employed to give a length which in effect corresponds to a given lapse of time. In explanation, it is to be remembered that in any continuous flow processing it is not possible to stop one portion of the belt to cool the product down to a desired temperature. The only alternatives are either to change the amount of refrigeration applied, which is often not desirable, particularly in a tempering tunnel or to increase or decrease the time that the belt takes to pass through the tempering tunnel. It will be believed evident that the candies must be taken away from the machine just as quickly as they are processed in any part of the machine. Otherwise there would soon be a build-up of the product at the slowed down point and as we are dealing with a machine which produces a large volume in a relatively short time, any such arrangement would not be tenable. The entire process must be maintained as a uni-directional continuous flow. For this reason the sectional type of tempering tunnel will be seen to be the most practical method for changing the length of time in which varying types of mix can be subjected to refrigeration.

It is believed that it will be clearly apparent from the above description and the disclosure in the drawings that the invention comprehends a novel construction of an integrated candy making machine.

Having thus disclosed my invention, I claim:

1. An integrated candy making machine, comprising: a supply tank having means for maintaining a desired temperature in a fluent candy base and mixing means to insure a continuously homogeneous mixture in the same; a first horizontal power driven candy conveyor belt; a candy base discharge header connected to said tank having a plurality of discharge openings to deliver candy base at spaced intervals across said belt; means for distributing said base uniformly across said belt as a candy ribbon; refrigerating means for cooling said candy base; a second horizontal power driven candy conveyor belt, aligned with said first belt, moving at an increased speed to permit of longitudinal spacing of candy pieces; a longitudinal candy cutter for cutting said candy ribbon longitudinally into a plurality of strips; a transverse candy cutter and means connected to said transverse cutter for moving said transverse cutter downwardly to sever the candy strips into pieces and then advancing said transverse cutter longitudinally of said second belt for spacing the cut candy pieces in longitudinally spaced relationship on said second belt; a third horizontal candy conveyor belt aligned with said second belt; a candy coating means for flowing coating over the top, sides and ends of each piece of candy base; means for distributing candy coating uniformly over said candy pieces; a fourth candy conveyor belt aligned with said third belt for receiving coated candy pieces and an elongated sectional tempering tunnel housing said fourth belt and having progressively decreasing air temperatures and a discharge end for delivering candy pieces at a firmness suitable for packing in sales packages.

2. The subject matter of claim 1 in which said transverse candy cutter consists of a knife disposed transversely of said second belt and having spaced rectangular teeth for engaging alternate strips of candy and cutting rectangular pieces of candy and means for moving said knife transversely of said second belt to successively engage and cut each strip of candy.

3. An integrated candy making machine, comprising:

a supply tank having heating means for maintaining the desired temperature in a fluent candy base and a power driven vertical shaft having mixing means mounted thereon to insure a continuously homogeneous mixture in the same; a first horizontal power driven candy conveying belt; a candy base discharge header having a plurality of discharge openings disposed transversely of said belt to deliver fluent candy base at a plurality of spaced points across said belt; a power driven pump to draw a predetermined amount of fluent candy base from said supply tank and deliver it through connected pipes to said discharge openings; power driven means for distributing said base uniformly across said belt as a candy ribbon of uniform depth; refrigerating means for cooling said candy base; a second horizontal power driven candy conveying belt disposed to receive candy base from said first belt and moving at an increased speed to permit of longitudinal spacing of candy pieces; a longitudinal candy cutter for cutting said ribbon longitudinally into strips; a transverse candy cutter and means connected to said transverse cutter for moving said transverse cutter downwardly to sever the candy strips into pieces and then advancing said transverse cutter longitudinally of said second belt for spacing the cut candy pieces in longitudinal spaced relationship on said second belt; a third horizontal candy conveying belt disposed to receive candy pieces from said second belt; a candy coating means for coating the top, sides and ends of each piece of candy base; said candy coating means having a short length of open mesh belt for receiving candy pieces from said third conveyor belt and carrying them through said coating means; means for distributing candy coating over said candy pieces; a fourth candy conveying belt for receiving coated candies from said open mesh belt and a tempering tunnel made of a plurality of aligned sections and having progressively decreasing air temperatures and having a discharge end for delivering candy pieces at a firmness suitable for packing in sales packages.

4. The subject matter of claim 3 in which said means for distributing said base uniformly across said belt comprises: a plurality of spreading heads disposed in spaced relationship across said belt, each having an oscillating paddle disposed above and substantially touching said belt; an oscillating vertical shaft for each paddle terminating in a crank top; a flexible shaft member operatively connecting said cranks and a power driven crank for giving reciprocating motion to said shaft member.

5. The subject matter of claim 3 in which said refrigerating means for cooling said candy base comprises: a refrigerating plate disposed below said first belt and close thereto; a refrigerating plate disposed sufficiently above said belt to permit the passage of said candy base and a stream of refrigerated air and means for providing said refrigerated air.

6. The subject matter of claim 3 in which said longitudinal candy cutter comprises: a framework for candy cutting wires, said framework adjustably positioning said wires vertically and between the substantially abutting end of said first candy conveying belt and said second candy conveying belt and in the path of the ribbon of candy base so as to cut a plurality of candy base strips.

7. The subject matter of claim 3 in which said transverse candy cutter has a toothed knife operatively mounted in a knife assembly comprising: end plates connected by knife positioning track means for the transverse movement of said knife; a power driven longitudinal movement cam; two pivoted levers mounted on a common transverse shaft, one of which has a follower bearing on said cam, and extending upwardly to the level of said end plates, parallel links operatively joining said levers and said plates in substantially a parallelogram arrangement for the movement of said knife assembly longitudinally of said belt; a lift cam mounted to revolve with said longitudinal movement cam; a lift rod having a follower riding on said lift cam and pivotably connected to said knife assembly to lift said knife assembly when it is timely to lift said knife over one group of strips of candy to a position to cut the alternate strips and guide means in the form of a grooved bar for engaging a detent secured to said knife assembly and to assure accurate positioning of said knife during the transverse cutting of said candy base strips and the spacing of the cut pieces of candy longitudinally of said belt.

8. An integrated candy making machine, comprising: a supply container for holding candy base material in a fluent homogeneous mixture therein; a power driven first horizontal continuous conveying belt adjacent to and leading away from said supply container; a fluent candy base discharge means connected to said supply container and including a header overlying and spaced above said first belt for delivering candy base material to said first belt; movable distributing means supported in closely spaced relationship to said belt and said header for distributing said fluent candy base material uniformly over said belt; cooler element means supported above and below substantially the entire length of said first belt for cooling said candy base material; a faster moving, independently power driven second horizontal continuous conveying belt continuing from a point adjacent the outer end of said first belt; a longitudinal candy base cutter means generally at the outer end of said first belt for slicing said base material into longitudinally disposed strips; a transverse base material cutter means positioned generally at the end of said second belt, adjacent said first belt, said transverse cutter having coacting actuating means moving said transverse cutter both transversely for alternative cutting of candy strips into pieces and longitudinally for spacing said pieces each from the others; a bottom coating means for said pieces located generally at the end of said second belt; and a top, side and end coating means for said pieces beyond said bottom coating means.

9. The candy making machine according to the structure of claim 8 and in which a forced air heat exchange means directs air over said first belt between said cooler element means for dissipating heat from said candy base material.

10. The combination according to claim 9 in which said bottom coating means includes an open link belt with a candy receiving horizontal portion supported at each end by driving shaft means; a tank containing coating material and located below said belt horizontal portoin; a lowermost sheave below the top surface of the coating material in said tank and around which said link belt passes to be resupplied with coating; said horizontal portion of said open link belt also providing means for transferring candy pieces from said second conveying belt to a third power driven continuous conveying belt.

11. The combination according to claim 10 further provided with a single, jointed power shaft for driving the candy conveying belts, including said second and third belts and excepting said first belt, at uniform linear speed throughout said candy making machine.

References Cited by the Examiner

UNITED STATES PATENTS

| | | | |
|---|---|---|---|
| 1,226,824 | 5/17 | Steely | 107—54.7 |
| 1,524,230 | 1/25 | Bausman | 107—54.7 |
| 1,546,000 | 7/25 | Bausman | 107—54.7 |
| 1,552,570 | 9/25 | Stimson | 107—69 |
| 1,608,302 | 11/26 | Cloud | 107—54.7 |
| 1,915,528 | 6/33 | Haug | 107—54.6 |
| 2,612,852 | 10/52 | Morrison | 107—54.6 X |
| 2,922,384 | 1/60 | Sevigny | 107—4.7 |
| 2,938,474 | 5/60 | Filler | 107—69 |
| 2,956,524 | 10/60 | Dewhurst et al. | 107—69 |
| 3,009,427 | 11/61 | Bell | 107—4.7 X |

IRVING BUNEVICH, Primary Examiner.

JOSEPH D. SEERS, CHARLES A. WILLMUTH, ROBERT E. PULFREY, Examiners.